F. W. REES.
ELECTRIC SWITCH FOR AUTOMOBILES.
APPLICATION FILED NOV. 29, 1919.
1,365,194. Patented Jan. 11, 1921.
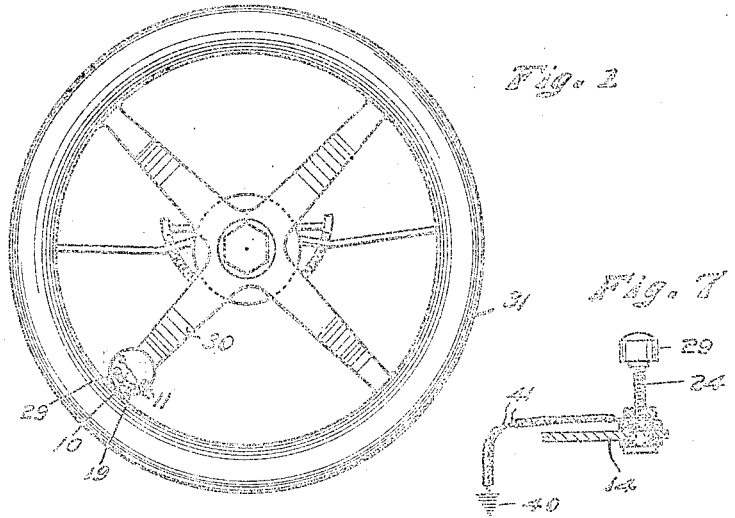
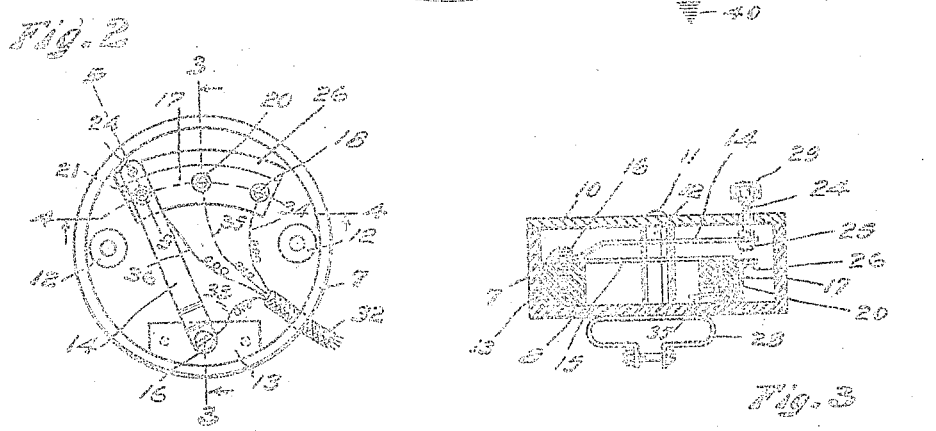
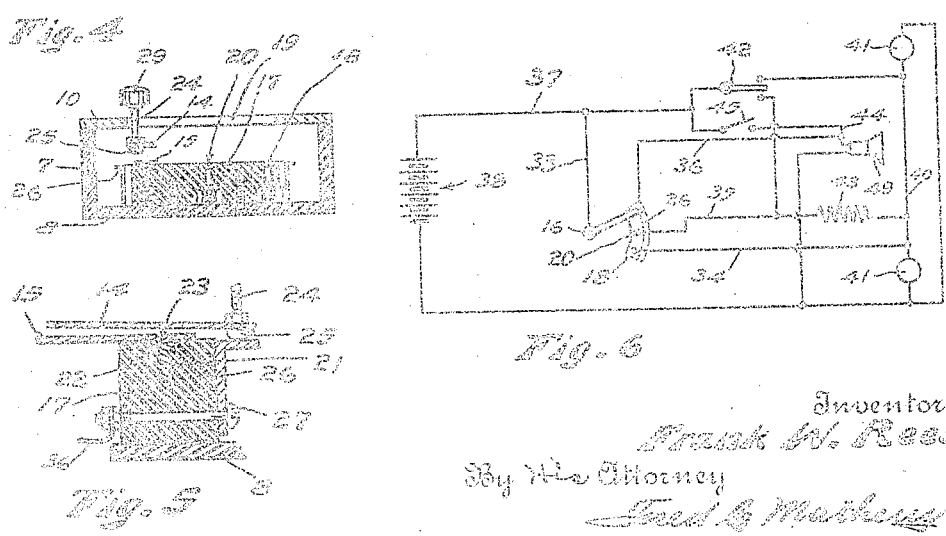

UNITED STATES PATENT OFFICE.

FRANK W. REES, OF SEATTLE, WASHINGTON, ASSIGNOR OF ONE-FOURTH TO OTOHIKO OTA AND THREE-FOURTHS TO JOHN T. W. JAY, BOTH OF SEATTLE, WASHINGTON.

ELECTRIC SWITCH FOR AUTOMOBILES.

1,365,194.  Specification of Letters Patent.  Patented Jan. 11, 1921.

Application filed November 29, 1919. Serial No. 341,463.

*To all whom it may concern:*

Be it known that I, FRANK W. REES, a citizen of the United States, residing at Seattle, in the county of King and State of Washington, have invented a certain new and useful Improvement in Elecertic Switches for Automobiles, of which the following is a specification.

My invention relates to improvements in auxiliary electric switch mechanism for controlling the circuits to the lights and to the audible signaling device, as to the horn or siren of a motor vehicle, and the object of my improvement is to provide switch mechanism that may be carried on the steering wheel of the motor vehicle where it may be reached without necessitating the removal of the hand from the steering wheel and that is easily operated to open or close the circuits to the lights and horn.

Another object is to provide switch mechanism of this nature that may be installed without alteration of the wiring common to motor vehicles and that will operate independently of, and will not affect the use of, the ordinary light and horn switches that are usually located on the dash or cowl of the vehicle.

A further object is to provide a switch of simple and efficient construction that is relatively cheap to manufacture and easy to install and that may be sold as an accessory to be installed on motor vehicles already in use.

A still further object is to provide a switch having a blade that may be moved from side to side to selectively close any one of a plurality of lamp circuits and that may be depressed when in any position to close a circuit to a horn or siren.

The invention consists in the novel construction, adaptation and combination of parts of an auxiliary electric switch for controlling the lamp and horn circuits of a motor vehicle as will be more clearly hereinafter described and claimed.

In the accompanying drawings Figure 1 is a plan view of the steering wheel of a motor vehicle showing my auxiliary switch applied thereto; Fig. 2 is a view of the switch with the top cover plate removed showing the several parts of the switch mechanism in plan; Fig. 3 is a view in cross section substantially on a broken line 3, 3 of Fig. 2; Fig. 4 is a view in cross section substantially on a broken line 4, 4 of Fig. 2; Fig. 5 is an enlarged fragmentary sectional view substantially on a broken line 5, 5 of Fig. 2. Fig. 6 is a wiring diagram showing one convenient wiring arrangement that may be employed when installing my switch on the ordinary motor vehicle, and Fig. 7 is a fragmentary sectional view of a modified form of contact means.

Referring to the drawings, throughout which like reference numerals designate like parts, the numeral 7 designates a cylindrical switch housing preferably constructed of fiber and having an integral bottom 8 and a removable cover plate 10 that is adapted to be secured to the switch housing by screws 11 that screw into posts 12 that are rigidly secured to the bottom 8 of the housing.

The housing is provided near one side with a fixed fiber block 13 to which a switch arm, comprising an upper blade 14 and a lower blade 15 is pivoted by a screw 16. The two parts or blades of the switch arm are integral and are doubled or folded at the point where the arm is pivoted, the upper blade 14 being bent away from the lower blade 15 at a point a short distance away from the pivot and the two blades 14 and 15, thence extending substantially parallel with each other in spaced apart relation.

The free end of the lower blade 15 of the switch arm is adapted to rest upon and move over an arcuate fiber block 17 that is provided with two contact screws or binding posts 18 and 20 and with a dummy or neutral post 21 as more clearly shown in Figs. 4 and 5. The heads of the posts 18, 20 and 21 are each preferably recessed as at 22 for the reception of a protuberance 23 that is formed in the end of the switch blade 15 and by which such switch blade is caused to snap into contact with the several posts.

The upper blade 14 of the switch arm is slightly longer than the lower blade 15 and is provided with an upwardly projecting stem 24 having a removable button 29 on the upper end thereof and having a head 25 on its bottom end that forms a contact knob on the under side of such switch blade and is adapted to be depressed into the position shown in Fig. 5 to make contact with an arcuate metallic contact member 26 that is secured to the front or outer side of the fiber block 17 and is electrically connected with a binding post 27 that extends through the block 17, the arrangement being such that contact with the member 26 may be had by depressing the end of the switch arm 14 regardless of the angular position of such arm. The stem 24 is arranged to project upwardly through an arcuate slot 19 in the cover plate 10, and the button 29 is secured to the top end of such stem so that it may be engaged by the thumb in manipulating the switch.

The switch arm comprising the blades 14 and 15 is made of a single piece of resilient metal, thereby affording a cheap construction and at the same time forming an efficient and compact device for the purpose required.

The housing 8 may have a clip 28 connected therewith by which it may be secured to a spoke 30 of the steering wheel 31 of a motor vehicle.

32 is a flexible conduit that enters the housing 7 from one side and carries four insulated wires 33, 34, 35 and 36 that connect with the switch arm pivot 16, the full light binding post 18, the dimmer binding post 20 and the horn contact binding post 27 respectively. The wire 33 connects with a wire 37 that leads to the battery 38 or other source of supply of electrical current of the vehicle. The wire 34 connects with a circuit wire 40 that leads to the lamps 41 of the vehicle at a point between the lamps and a control switch 42 which is usually on the cowl board of the vehicle. The wire 35 connects through a resistance 43 with the circuit wire 40, thereby completing a dimmer circuit to the lamps. The wire 36 connects with a wire 44 that leads to a horn or audible signal device 49, the connection being made at a point between the horn and a switch 45 in the horn circuit which is usually located on the cowl of the vehicle.

By the above description it will be seen that the auxiliary switch wires 34, 35 and 36 are cut in at points between the lamps and the horn and their respective control switches 42 and 45 so that shunt circuits around the switches 42 and 45 are closed, but which serve to control the flow of current to the lamps and horn when the switches 42 and 45 are open.

Some motor vehicles are wired so that the horn or audible signal is connected on one side with the battery while the other side is grounded, the usual controlling switch being interposed between the horn to the ground connection. When installing my switch mechanism on vehicles wired in this manner, the stem 24 is insulated from the blade 14 as shown in Fig. 7 and is connected with a ground 40 by an insulated circuit wire 41 and the arcuate contact member 26 is connected with the ground wire of the horn at a point between the horn and the usual switch that controls such horn.

The auxiliary switch is preferably attached to the left hand side of the steering wheel so that as the driver's left hand grasps the wheel, his left thumb may rest on the knob or button 29 in a convenient position to control the lights or sound the horn while his right hand is free for shifting gears and other work connected with the driving of the vehicle.

In some cars it is customary to employ a resistance in the dimmer circuit as shown, while in others separate small lamp bulbs are provided in each headlight which are used for producing a dim light. In cars where the latter form of lighting is employed, the wire 35 will connect with the circuit to the smaller lamps instead of connecting with the larger lamps through the resistance coil.

It will be understood that changes in the form, dimensions and arrangement of parts of this device may be resorted to within the scope of the following claims.

What I claim is:

1. An auxiliary lamp and horn control switch for motor vehicles comprising a housing, a plurality of separable contact members arranged in spaced apart relation within said housing, a continuous contact member arranged adjacent to said separable contact members, and a switch arm pivoted for oscillation within said housing, said switch arm comprising a blade arranged to engage said separable contact members as said switch arm is oscillated and another blade arranged to be depressed into contact with said continuous contact member regardless of the angular position of said switch arm.

2. A switch of the class described comprising a housing, an arcuate block of insulating material disposed in said housing, spaced contact members in said block, a continuous arcuate contact member adjacent the outer side of said block, and a pivotally mounted switch arm having two substantially parallel, spaced apart blades of flexible material disposed one above another, the lowermost of said blades being arranged to engage said spaced contacts, and the uppermost of said blades being arranged to be deflected to make contact with said arcuate contact member.

3. A switch of the class described comprising a housing, an arcuate block of insulating material disposed within said housing, spaced contact members in said block of insulating material, a continuous, arcuate, metallic contact member adjacent the outer side of said arcuate block, and a switch arm pivoted for oscillation within said housing said switch arm comprising two integral flexible blades formed of a strip of metal bent double at the pivoted end, thence bent apart at a point near the pivot thereof and arranged to project outwardly in substantially parallel spaced apart relation, the lowermost of said blades being arranged to make contact at its outer end with said spaced contact members as said switch arm is moved into various angular positions and the uppermost of said blades being longer than said lowermost blade and being arranged to be depressed to make contact with said continuous metallic contact member for any and all angular positions into which said switch may be turned.

Signed at Seattle, Washington, this 12th day of November, 1919.

FRANK W. REES.